(12) United States Patent
Kikuchi

(10) Patent No.: US 9,897,337 B2
(45) Date of Patent: Feb. 20, 2018

(54) COMBINATION SCALE

(71) Applicant: Yamato Scale Co., Ltd., Akashi-shi, Hyogo (JP)

(72) Inventor: Kohei Kikuchi, Akashi (JP)

(73) Assignee: Yamato Scale Co., Ltd., Hyogo (JP)

( * ) Notice: Subject to any disclaimer, the term of this patent is extended or adjusted under 35 U.S.C. 154(b) by 182 days.

(21) Appl. No.: 14/942,490

(22) Filed: Nov. 16, 2015

(65) Prior Publication Data

US 2016/0161135 A1    Jun. 9, 2016

(30) Foreign Application Priority Data

Dec. 3, 2014    (JP) ................... 2014-244654

(51) Int. Cl.
| | | |
|---|---|---|
| *G01G 11/14* | (2006.01) | |
| *F24F 7/08* | (2006.01) | |
| *G01G 19/393* | (2006.01) | |
| *G01G 13/00* | (2006.01) | |

(52) U.S. Cl.
CPC ............. *F24F 7/08* (2013.01); *G01G 11/14* (2013.01); *G01G 13/003* (2013.01); *G01G 19/393* (2013.01)

(58) Field of Classification Search
CPC .... G01G 11/14; G01G 13/003; G01G 19/393; G01G 13/00–13/34
See application file for complete search history.

(56) References Cited

U.S. PATENT DOCUMENTS

| | | | | | |
|---|---|---|---|---|---|
| 4,566,549 | A | * | 1/1986 | Oshima | B08B 5/02 15/301 |
| 4,977,968 | A | * | 12/1990 | Kramer | B08B 3/02 177/245 |
| 5,621,194 | A | * | 4/1997 | Koyama | G01G 19/393 134/104.1 |
| 5,906,294 | A | * | 5/1999 | Ikeya | B65G 27/00 222/200 |
| 6,079,122 | A | * | 6/2000 | Rajkovich | F26B 21/083 34/574 |

FOREIGN PATENT DOCUMENTS

| | | |
|---|---|---|
| JP | 62-168431 | 7/1987 |
| JP | 6-317454 | 11/1994 |
| JP | 2001-255199 | 9/2001 |
| JP | 2014-134423 | 7/2014 |

OTHER PUBLICATIONS

Machine translation of JPH06317454.*

* cited by examiner

*Primary Examiner* — Natalie Huls
(74) *Attorney, Agent, or Firm* — Norris McLaughlin & Marcus, P.A.

(57) ABSTRACT

This invention relates to a combination scale including an ejector to be supplied with compressed air to ventilate a central cabinet of the combination scale, wherein an interior of the central cabinet and a suction port of the ejector are connected to and communicating with each other.

3 Claims, 4 Drawing Sheets

F I G. 2
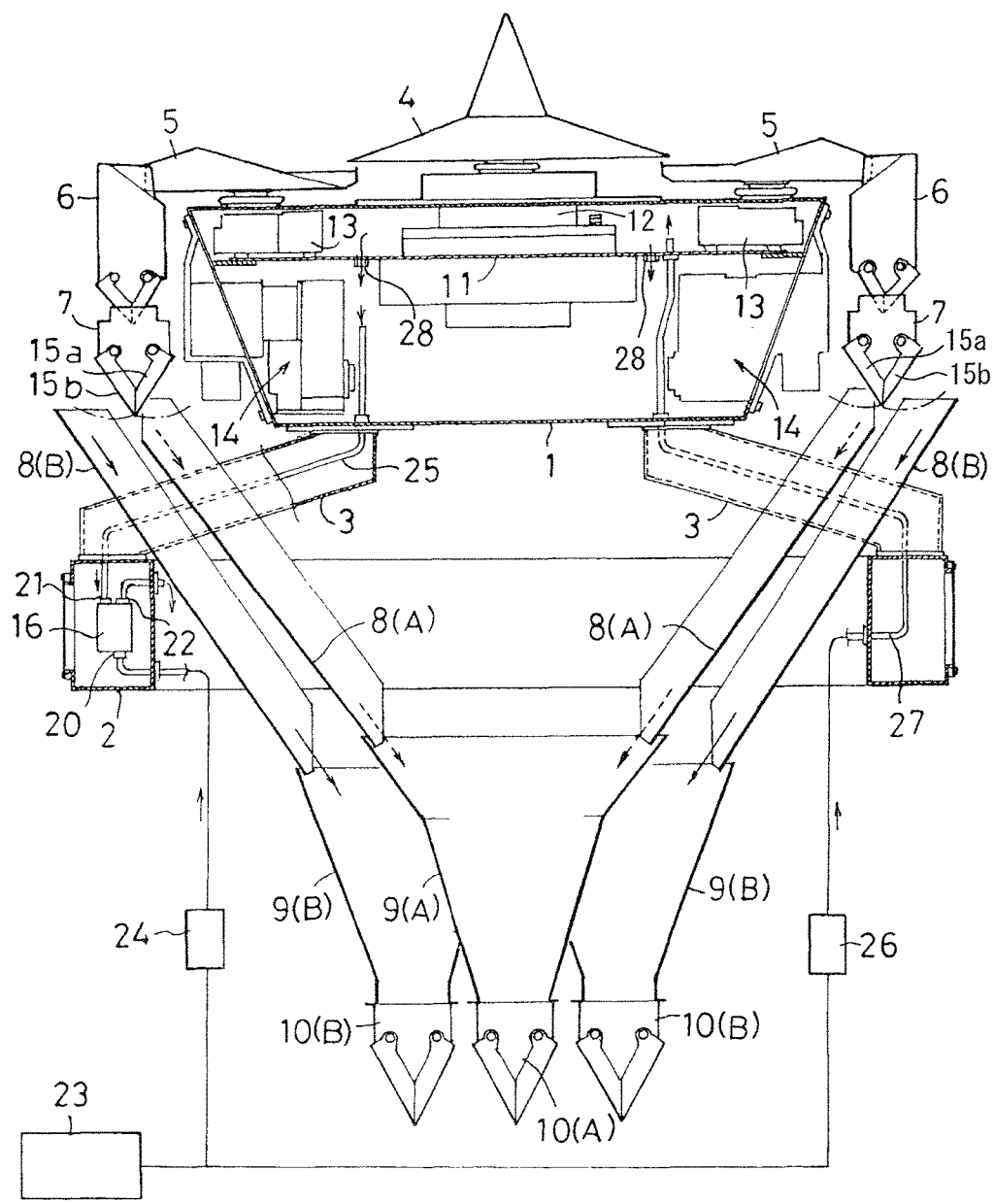

F I G. 3
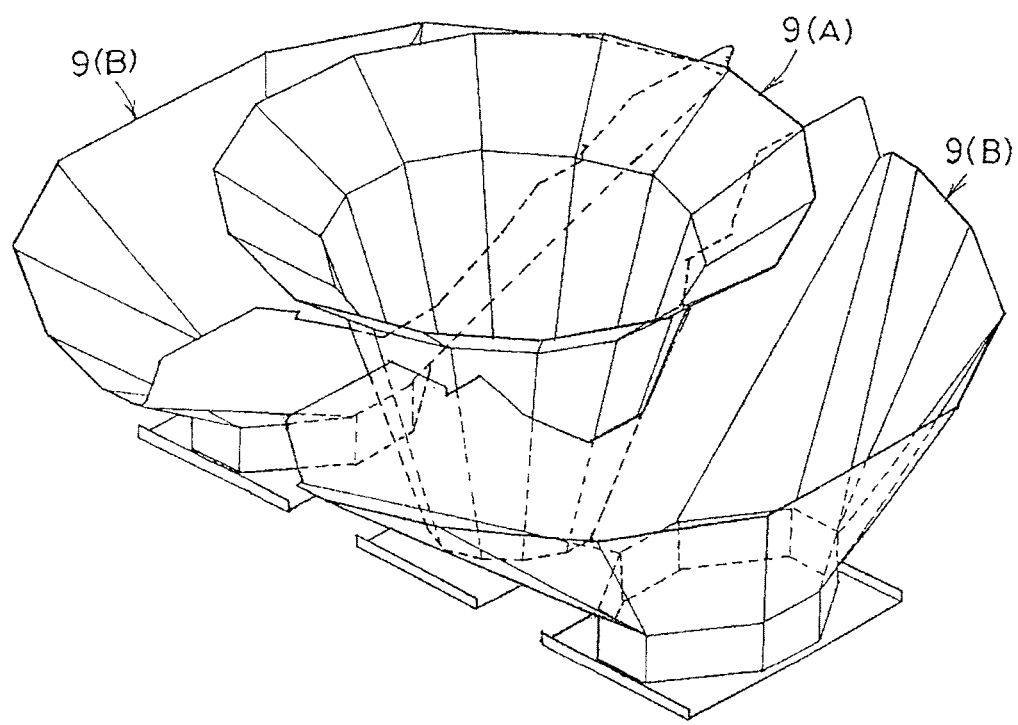

COMBINATION SCALE

BACKGROUND OF THE INVENTION

Field of the Invention

This invention relates to a combination scale configured to weigh a predetermined quantity of articles, such as various kinds of foodstuffs, more particularly to a combination scale to which thermal management solutions have been applied.

Conventionally, a combination scale is structurally characterized as described below. Articles to be weighed supplied to the combination scale are radially distributed by a distribution feeder. The distributed articles are delivered by a plurality of linear feeders linearly outward by way of vibrations and thrown in a plurality of feeding hoppers facing delivery ends of the linear feeders. The feeding hoppers open their gates to feed the articles into a plurality of weigh hoppers disposed below. The combination scale variously combines the articles in the weigh hoppers to select a combination of weigh hoppers in which a total weight value of the articles fails within a predetermined weight range. Then, the combination scale opens the gates of the selectively combined weight hoppers to discharge the articles via, for example, collecting chutes, into a packaging machine installed down below.

There is a central cabinet having a hollow interior at the center of the combination scale. In the interior of the cabinet are housed vibration exciters that vibrate the respective feeders, driving units that open and close the gates of the hoppers, and weighing units including weight sensors that detect weights of the articles thrown in the weigh hoppers.

The central, cabinet is a closed type container to block any foreign matter or articles to be weighed that might otherwise enter therein. In the closed central cabinet, its internal temperature is often elevated by heat generated from, for example, the driving units, or by heat transmitted from hot articles to be weighed. These thermal impacts elevate the internal temperature of the central cabinet, adversely affecting the devices housed in the central cabinet, typically the weight sensors. This may be a problem in that weight values become unstable.

As possible solutions to such a problem, the central cabinet may be ventilated, to lower its temperature inside as described in the patent document 1 or 2, or the central cabinet may be directly cooled by a Peltier device as described in the patent document 3. The cited documents 1 to 3 are listed below.

Patent Document 1: Japanese Laid-Open Patent Application No. H06-317454
Patent Document 2: Japanese Laid-Open Patent Application No. 2001-255199
Patent Document 3: Japanese Laid-Open Patent Application No. 2014-134423

In the patent documents 1 and 2, since the electrically-driven fans are used for ventilation, fan motors driving the fans becomes heat sources and additionally, in the case of waterproof combination scales, integral waterproofing is required tor a wiring system of the fan motors.

In the scale described in the patent document 3, the location of the Peltier device and its vicinity may be efficiently cooled. Yet, hot air is likely to rise and rest in an upper part of the cabinet interior, and this scale farther needs a fan for ventilation in order to cool the entire cabinet interior, which invites cost increase.

The invention was accomplished to solve these conventional problems. The invention provides a combination scale wherein a cabinet may be efficiently ventilated to cool its interior in the absence of any fans to enable a weighing performance substantially heat-unaffected and thereby improved in accuracy.

SUMMARY OF THE INVENTION

To this end, the invention provides the following technical features:

Solutions to the Problem

1) A combination scale according to the invention includes: a cabinet; a plurality of hoppers arranged around the cabinet to receive articles to be weighed thrown therein, the hoppers having gates; driving units that open and close the gates of the hoppers; weighing units that weigh the articles thrown in the hoppers, the driving units and the weighing units being housed in the cabinet; and an ejector to be supplied with compressed air to ventilate the cabinet.

According to the invention, the cabinet may be ventilated to release hot air outside from its interior by simply supplying the ejector with compressed air from any of conventionally available compressors often installed in, for example, plants. The ejector allows waterproof electric wirings to be dispensed with. Further advantageously the ejector is a space-saving device relatively small in size. The ejector thus advantageous may be easily mounted in any existing weighing devices.

2) According to a preferred aspect of the invention, the ejector has a suction port connected to and communicating with the cabinet, and air in the cabinet is suctioned and released outside through the suction port.

This preferred embodiment may ventilate the cabinet by suctioning hot air in the cabinet and releasing it outside.

3) According to another preferred aspect of the invention, the combination scale farther includes an air purge device that supplies air into the cabinet.

This preferred embodiment may facilitate suction and release of hot air in the cabinet outside, efficiently ventilating the cabinet to cool its interior.

4) According to yet another preferred aspect of the invention, a pressure of the air supplied into the cabinet by the air purge device is regulated to be higher than a pressure of the air suctioned from the cabinet by the ejector to keep an internal pressure of the cabinet at a higher pressure than atmospheric pressure.

This preferred embodiment may not only facilitate suction and release of hot air in the cabinet outside, but also may effectively prevent dust and/or wash water from entering the cabinet by the internal pressure of the cabinet higher than atmospheric pressure. This may be an advantageous feature for a waterproof structure.

5) According to yet another preferred aspect of the invention, the air purge device includes a compressor, wherein a part of compressed air from the compressor is supplied to the ejector, and a remaining part of the compressed air from the compressor is introduced into the cabinet.

According to this preferred embodiment, a drive source for ventilating the cabinet to cool its interior thereof can be composed of a single compressor. Moreover, conventionally compressors are installed in most of the plants for cleaning and other purposes, and therefore, it is possible to effectively utilize existing compressors for ventilating the cabinet to cool its interior only by applying slight remodeling to an air-supply piping arrangement thereof.

6) According to yet another preferred aspect of the invention, the cabinet is supportably coupled to a base having a hollow interior by means of a leg having a hollow interior, the ejector is housed in the interior of the base, and the suction port of the ejector and the interior of the cabinet are connected to and communicating with each other by means of a tube inserted in the interior of the leg.

According to this preferred embodiment, by effectively utilizing the internal spaces of the base and leg, a structure for ventilating the cabinet to cool its interior is compactly installed to the combination scale.

As described thus far, the invention provides a combination scale wherein the cabinet may be efficiently ventilated to cool its interior to enable a weighing performance substantially heat-unaffected and thereby improved in accuracy.

BRIEF DESCRIPTION OF THE DRAWINGS

FIG. 2 is a schematic front view of the combination scale of FIG. 1 in longitudinal cross section.

FIG. 3 is a perspective view of a collection funnel.

DETAILED DESCRIPTION OF THE INVENTION

Hereinafter, an embodiment of the invention is described in detail referring to the accompanying drawings.

Figure 1:
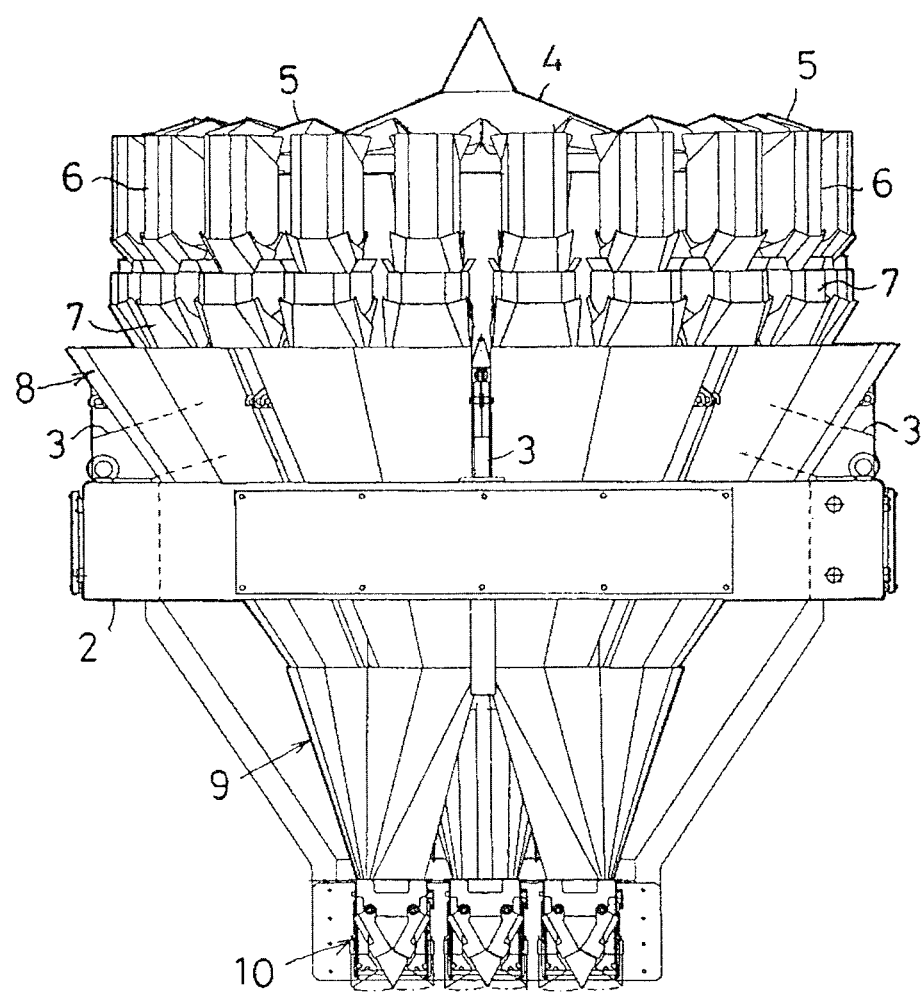
FIG. 1 is a front view of a combination scale according to an embodiment of the invention.

FIG. 1 is a front view of a whole combination scale according to an embodiment of the invention. FIG. 2 is a schematic front view of the combination scale of FIG. 1 in longitudinal cross section.

The combination scale receives articles to be weighed dropping therein from a feeding device, not illustrated in the drawings, at a position upward at the center. The combination scale then weighs the articles in a predetermine weight at a time and throws the weighed articles into a packaging machine not illustrated m the drawings.

As illustrated in FIG. 2, the combination scale includes a central cabinet 1 having a hollow interior and located at the center of the combination scale, and a base 2 having a hollow interior and a central part with a vertically through opening. The central cabinet 1 is supportably coupled to the base 2 by means of a plurality of legs 3. Above the central cabinet 1 is disposed a distribution feeder 4 that radially distributes by way of vibrations the articles thrown therein from delivery ends of the feeding device not illustrated. Around the distribution feeder 4 are arranged annularly a plurality of linear feeders 5 that deliver by way of vibrations the distributed articles linearly outward.

At positions below delivery ends of the linear feeders 5, there are feeding hoppers 6 and weigh hoppers 7 correspondingly to these feeding hoppers 6. Around the central cabinet 1 are arranged annularly a plurality of weigh modules each including a sequence of linear feeder 5, feeding hopper 6, and weight hopper 7.

Below the weigh hoppers 7 are located collecting chutes 8 to collect the weighed articles discharged from the weigh hoppers 7 selectively combined to meet a predetermined weight range. Below the collecting chutes 8 is disposed a collection funnel 9 to collect the weighed articles dropping therein from the collecting chutes 8. Further below the collection funnel 9 are arranged collection hoppers 10 that receive and temporarily store therein the weighed articles collected in the collection funnel 9. The collection hoppers 10 have gates that open and close in answer to a discharge request signal transmitted from the packaging machine.

The interior of the central cabinet 1 is divided in upper and lower sections by a partition plate 11. In the upper section is housed a vibration exciter 12 that vibrates the distribution feeder 4 and vibration exciters 13 that vibrate the respective linear feeders 5. In the lower section is housed a weighing and driving unit 14 having a plurality of driving units that opens and closes gates of the feeding hoppers 6 and the weight hoppers 7, and weighing units including weight sensors, such as load cells, that weigh the articles in the weigh hoppers 7.

The feeding hoppers 6, though its structure are not illustrated in detail in the drawings, are detachably supported on the outer side of the central cabinet 1 with a hooking structure. Further, the feeding hoppers 6 have a gate opening/closing link mechanism engageably coupled in an interlocking manner to operating arms of the driving units. The feeding hoppers 6 thus structured may be removable and conveniently washed. The weigh hoppers 7 are detachably supported on the weight sensors with a hooking structure. Further, the weigh hopper 7 has a gate opening/closing link mechanism engageably coupled, in an interlocking manner, to operating arms of the driving units. The weigh hopper 7 thus structured may be removable and conveniently washed.

The gate opening/closing driving units and the weight sensors are mounted in the central cabinet 1 through openings formed in its outer peripheral surface and are watertightly sealed by means of such a member as packing or seal washer, so that these units are waterproof.

The weigh hoppers 7 in this example each have inner and outer gates 15a and 15b that open and close by turns. The collecting chutes 8 are located corresponding to the inner and outer sides below the inner and outer gates 15a and 15b. The weighed articles discharged by opening the inner gate 15a of the weigh hopper 7 are guided downward by the inner-side collecting chute 8 (A). On the other hand, the weighed articles discharged by opening the outer gate 15b of the weigh hopper 7 are guided downward by the outer-side collecting chute 8 (B).

The collection funnel 9 includes an inner-side collection funnel 9 (A) provided correspondingly to the inner-side collecting chutes 8 (A) and a pair of outer-side collection funnels 9 (B) provided correspondingly to the outer-side collecting chutes 8 (B). As illustrated in FIG. 3, the pair of outer-side collection funnels 9 (B) are located in a manner that surround the inner-side collection funnel 9 (A).

The collection hopper 10 includes an inner-side collection hopper 10 (A) provided correspondingly to the inner-side collection funnel 9 (A), and a pair of outer-side collection hoppers 10 (B) provided correspondingly to the pair of outer-side collection funnels 9 (B). The gates of the inner-side collection hopper 10 (A) and the gates of the pair of outer-side collection hoppers 10 (B) open by turns in answer to the discharge request signal transmitted from the packaging machine. The gates of the pair of outer-side collection hoppers 10 (B) are operated to open simultaneously.

Thus, the articles are collected and discharged by inner and outer two groups of chutes, funnels, and hoppers, each including the collecting chute 8, collection funnel 9, and collection hopper 10. This may shorten a weigh-discharge cycle of the articles to be weighed, leading to an improved weighing performance.

This combination scale has a waterproof structure that may be particularly advantageous in weighing hot products, for example, boiled corns to be canned.

This combination scale ventilates the central cabinet 1 to lower its internal temperature in order to prevent heat of hot articles to be weighed from adversely affecting the devices housed in the central cabinet 1, which is hereinafter described.

Figure 4:
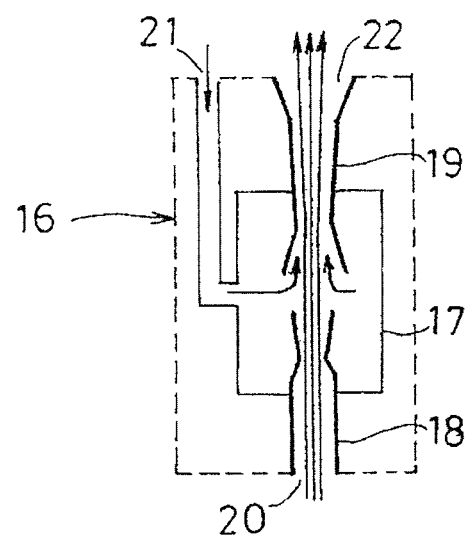
FIG. 4 is a drawing of the operation principle of an ejector.

As illustrated in FIG. 2, an ejector 16 is housed in the base 2 to which the central cabinet 1 is supportably coupled, Referring to the operation principle illustrated in FIG. 4, a nozzle 18 and a diffuser 19 are facing each other with an adequate interval therebetween in an air suction chamber 17 of the ejector 16. By blasting compressed air supplied through a feeding port 20 into the nozzle 18, high-speed jet stream of air is ejected through the nozzle 18 into the diffuser 19. This jet stream of air generates a negative hydrostatic pressure, thereby vacuumizing the air suction chamber 17. Because of the generated negative hydrostatic pressure and viscosity of air, ambient air is drawn in the jet stream of air flowing into the diffuser 19. The compressed air supplied through the feeding port 20 and air suctioned through an air suction port 21 communicating with the air suction chamber 17 are exhausted from an air exhaust port 22 through the diffuser 19.

In the described example, as illustrated in FIG. 2, the feeding port 20 is connected to and communicating with the compressor 23 via a first air unit 24 interposed therebetween. The air suction, port 21 is communicating with the central cabinet 1 via a tube 25 inserted through the hollow leg 3, and an open end of the tube 25 is fixedly tied with a code or the like not illustrated in the drawing by means of a tying band or the like at a suitable position in the lower section of the central cabinet 1.

By supplying the ejector 16 with the compressed air from the compressor 23 via the first air unit 24, air in the central cabinet 1 is suctioned and released outside.

A part of the compressed air from the compressor 23 is supplied to a second air unit 26. A tube 27 led out from the second air unit 26 is inserted through the leg 3 and connected to and communicating with the upper section of the central cabinet 1. These structural elements constitute an air purge device that blows cold outside air from the second air unit 26 into the central cabinet 1. The air purge device according to this embodiment includes the compressor 23, second air unit 26, and tube 27.

Thus the ejector 16, the tube 25 constituting piping arrangement of this ejector 16, the tube 27 constituting a part of the air purge device and so on are compactly installed to the combination scale by effectively utilizing the internal spaces of the base 2 and legs 3 thereof.

The first and second air units 24 and 26 each have a filter for dust removal and dehumidification. The first air unit 24 has a regulator for regulating a pressure of the air supplying to the ejector 16 to optional pressure values and the second air unit 26 also has a regulator for regulating a pressure of the air supplying to the air purge device to optional pressure values.

The partition plate 11 of the central cabinet 1 has through holes 28 formed at a plurality of positions. The cold outside air flows into the upper section of the central cabinet 1 and then spreads in the entire lower section via the through holes 28, reaching the circumference of the weighing and driving unit 14.

As described thus far, the compressed air from the compressor 23 is supplied to the ejector 16 to suction and release the air in the central cabinet 1 outside, while the compressed air from the compressor 23 constituting the air purge device is also introduced into the central cabinet 1. By the supply of cold air into the central cabinet 1, the hot air in the central cabinet 1 due to heat of hot articles and heat generated by the driving units housed therein may be released outside. Thus, the central cabinet 1 may be efficiently ventilated to prevent its internal temperature from increasing. This may prevent any adverse thermal impacts on the devices, typically the weight sensors, solving the problem of instability of weight values.

Since the compressed air from the compressor typically installed in most of the plants may be utilized, it becomes possible to ventilate the cabinet to cool its interior only by applying slight remodeling to an air-supply piping arrangement thereof. As a result the need to provide a ventilation fan having a fan motor that generates heat is eliminated.

This combination scale is a waterproof scale wherein the air-purge positive pressure and negative pressure resulting from suctioning by the ejector 16 are regulated to be kept in balance by the first and second air units 24 and 26, so that the internal pressure of the whole central cabinet 1 is higher than atmospheric pressure. Specifically, the air pressure supplied from the second air unit 26 into the central cabinet 1 is regulated to be higher than the air pressure at the air suction port 21 through which air is suctioned from the central cabinet 1 by the ejector 16.

The internal pressure of the central cabinet 1 higher than atmospheric pressure serves to block dust and/or wash water that might otherwise enter the central cabinet 1.

During the time when the combination scale is inactive, dry air may be supplied from the air purge device into the central cabinet 1 to prevent dew condensation in the central cabinet 1.

Another Embodiment

The invention may be implemented as described below.
1) The internal pressure of the central cabinet 1 is desirably higher than atmospheric pressure to ensure waterproofing and dust prevention. However, these purposes may be served if the internal pressure is at least kept at atmospheric pressure.
2) The through holes 28 are formed so that the cold outside air introduced in the upper section spreads in the lower section. These through holes are desirably formed at positions feeing a heat-generated site of the weighing and driving unit 14 in the lower section.
3) There may be a plurality of ejectors 16 so that the air in the central cabinet 1 is suctioned and released outside at a plurality of positions. This purpose; suctioning and releasing the air in the central cabinet 1 at a plurality of positions, may also be served by extending a plurality of tubes 25 from one ejector 16 having a large capacity.

The invention claimed is:
1. A combination scale comprising:
a cabinet;
an air purge device,
a plurality of hoppers arranged around the cabinet to receive articles to be weighed thrown therein, the hoppers having gates;
driving units that open and close the gates of the hoppers;
weighing units that weigh the articles thrown in the hoppers, the driving units and the weighing units being housed in the cabinet; and
an ejector to be supplied with compressed air to ventilate the cabinet,
wherein
the ejector has a suction port connected to and communicating with the cabinet,
air in the cabinet is suctioned and released outside through the suction port,
the air purge device comprises a compressor, and a part of compressed air from the compressor is supplied to the ejector, and a remaining part of the compressed air from the compressor is introduced into the cabinet.

2. The combination scale as claimed in claim 1, wherein a pressure of air supplied to the cabinet by the air purge device is regulated to be higher than a pressure of air suctioned from the cabinet by the ejector to keep an internal pressure of the cabinet at a higher pressure than atmospheric pressure.

3. The combination scale as claimed in claim 1, wherein the cabinet is supportably coupled to a base having a hollow interior by means of a leg having a hollow interior, the ejector is housed in the interior of the base, and the suction port of the ejector and the interior of the cabinet are connected to and communicating with each other by means of a tube inserted in the interior of the leg.

* * * * *